April 6, 1965 J. E. STOVALL 3,176,852
APPARATUS AND METHOD OF CONVEYING, STORING
AND FREEZING FOOD PRODUCTS
Filed Nov. 21, 1962 7 Sheets-Sheet 1

INVENTOR.
James E. Stovall
BY
ATTORNEY

April 6, 1965 J. E. STOVALL 3,176,852
APPARATUS AND METHOD OF CONVEYING, STORING
AND FREEZING FOOD PRODUCTS
Filed Nov. 21, 1962 7 Sheets-Sheet 2
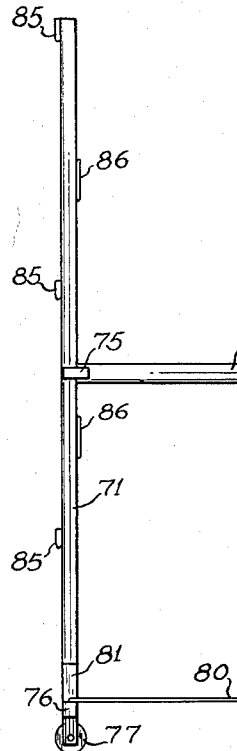
Fig. 5
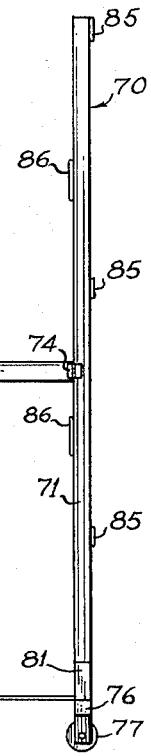
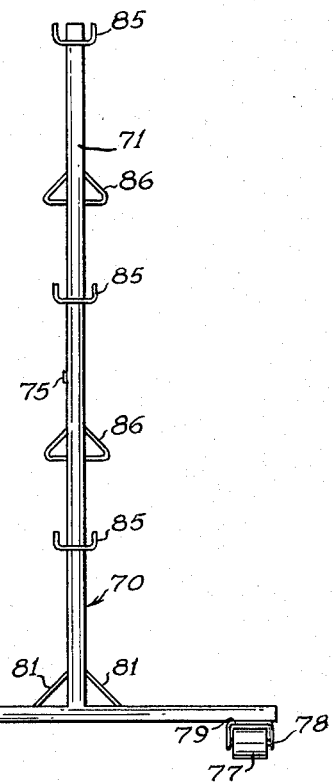
Fig. 6
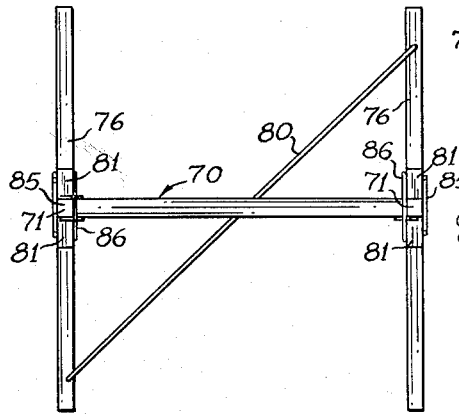
Fig. 7
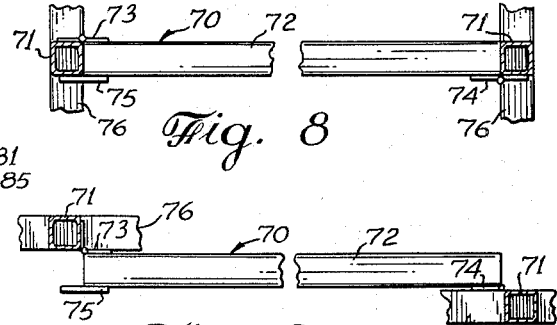
Fig. 8
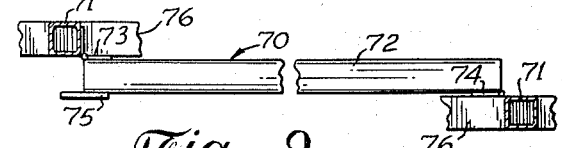
Fig. 9
INVENTOR.
James E. Stovall
BY
ATTORNEY INVENTOR.
James E. Stovall
BY
ATTORNEY

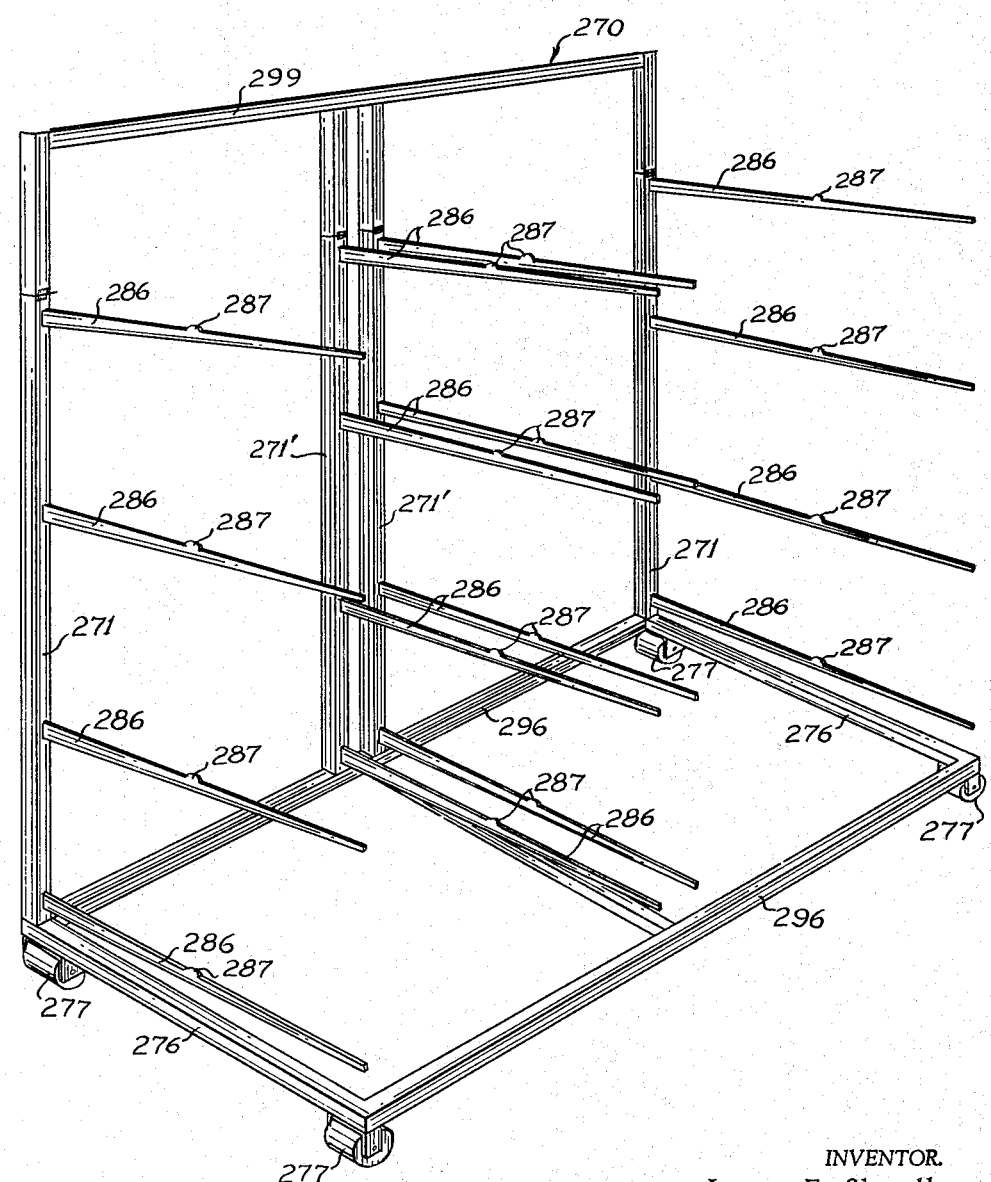

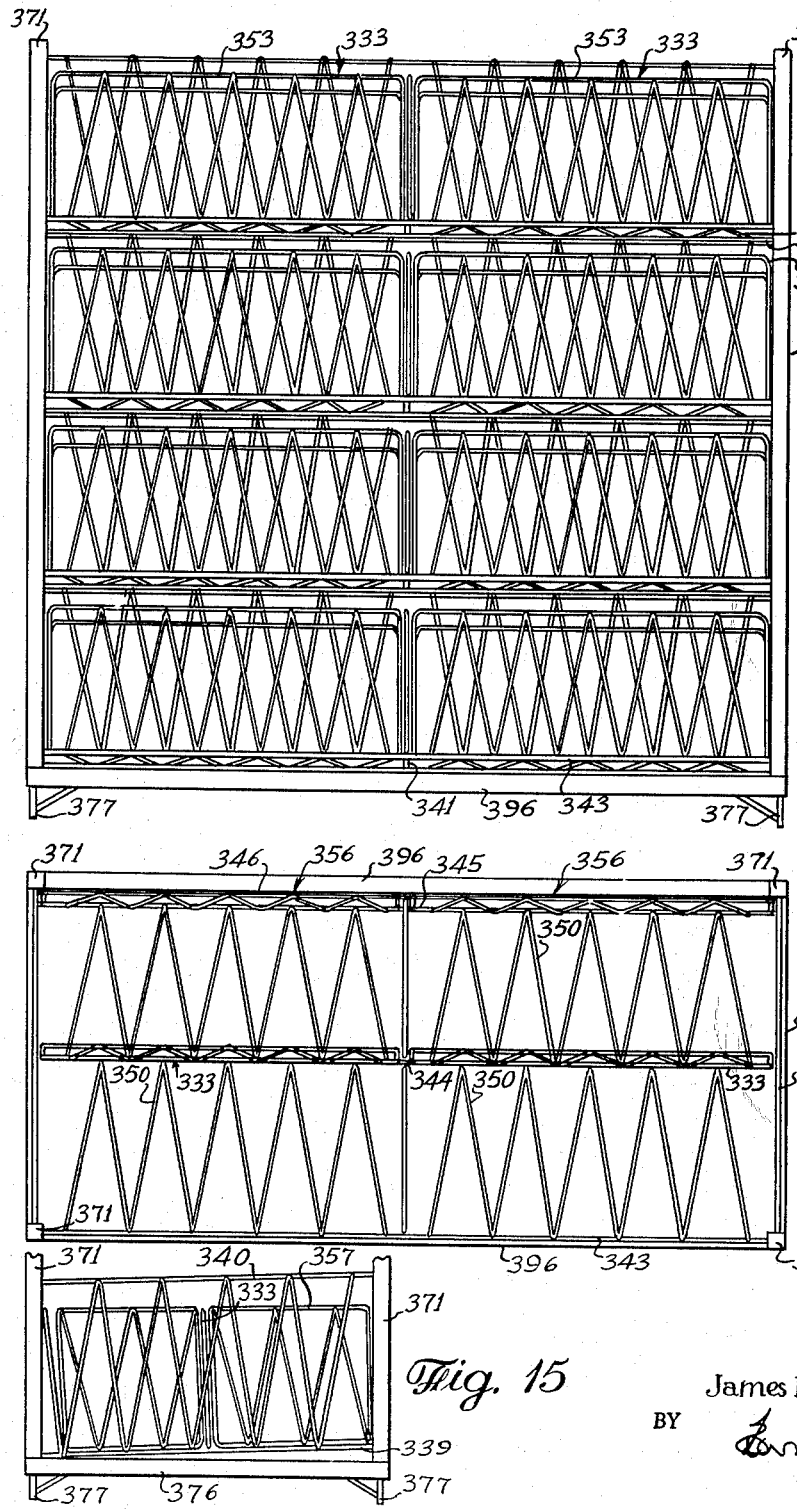

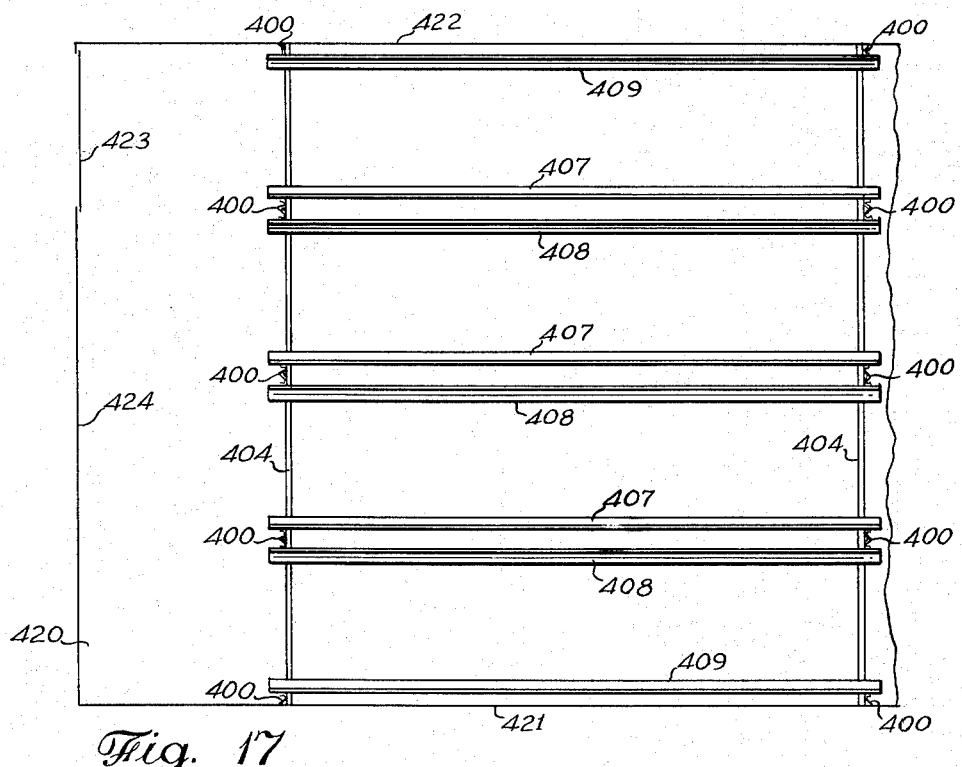
Fig. 17
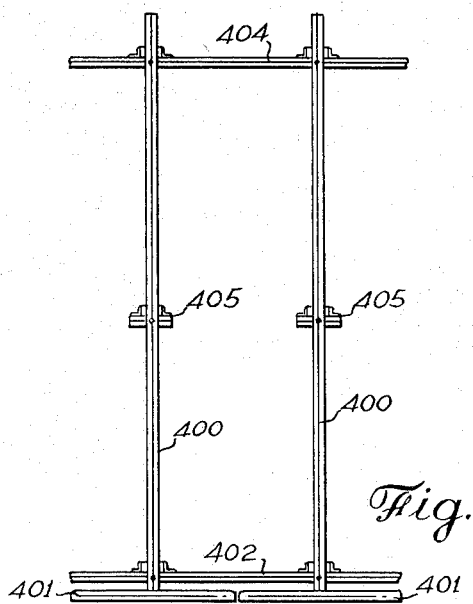
Fig. 18
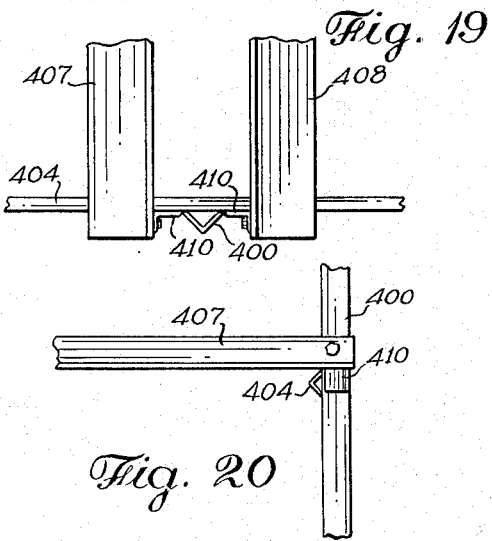
Fig. 19
Fig. 20
INVENTOR.
James E. Stovall
BY
ATTORNEY

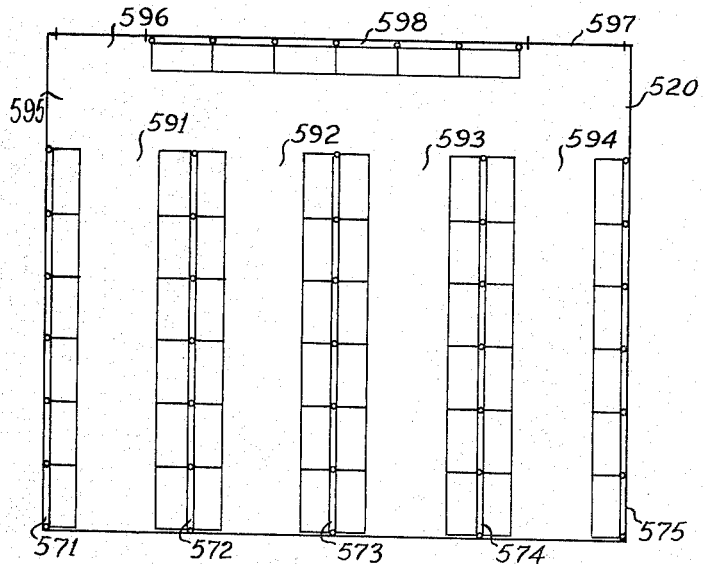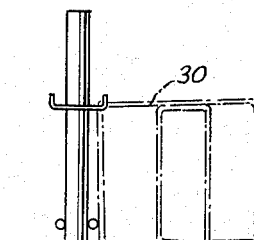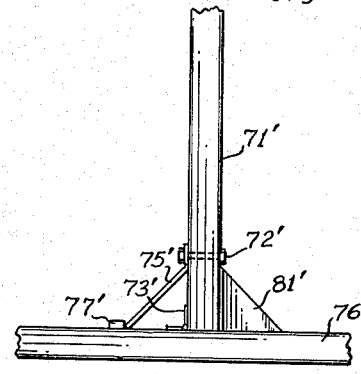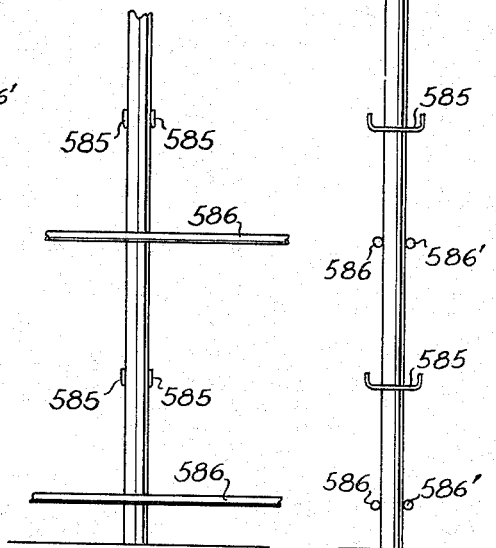

3,176,852
APPARATUS AND METHOD OF CONVEYING, STORING AND FREEZING FOOD PRODUCTS
James E. Stovall, Douglas, Ga.
(P.O. Box 753, Hendersonville, N.C.)
Filed Nov. 21, 1962, Ser. No. 239,232
16 Claims. (Cl. 211—126)

This invention relates to refrigeration and is more particularly concerned with apparatus and method of conveying, storing and freezing food products.

In the past, all of the so called hard ice cream manufacturers (as distinguished from those who vend their products while in the semi-soft condition at temperatures from 18° to 28° F.) maintain what is known to the industry as manufacturing room and hardening room. The ice cream is mixed and frozen and packaged in the manufacturing room and is reduced in temperature in the hardening room.

The mix from which ice cream is manufactured is composed of the standard ingredients, milk, cream, sugars, binders, i.e. gelatin or other edible substances. In the process of producing ice cream, the ice cream mix is fed to freezers where it is agitated or stirred as it is frozen. Such whipping is necessary to incorporate into the freezing product enough air to make the finished product smooth and amorphous, as contrasted to solid frozen ice.

As the ice cream or other frozen confection of a similar nature is discharged from the freezer, it is usually in a semi-frozen condition and, under good conditions, is at a temperature of approximately 22° F. This semi-hard condition enables the product to be fed into and fill the container into which it is put for further freezing (called hardening) and for sale. As a usual procedure these smaller packages, less than the 2½ gallon metal or paper containers, comprise about 80% of the wholesale ice cream manufacturers' volume of production of frozen confections.

These smaller packages, for convenience in handling, are then placed into larger unit containers, such as paper bags, boxes of paper, or boats covered with cellophane. Some of these are, in turn, placed in larger units for convenience in handling but seldom are the customer's orders of any one item large enough that even a full armload of one particular size and flavor of one particular product can be packaged in a single large package. Those who have tried this have found that the material for these larger packages, being non-returnable, are too expensive and do not in fact accomplish this purpose. For example, the deliverymen usually tear open the larger packages very soon after delivery is begun, thereby cluttering up the delivery truck, street, sidewalk, grounds or the customer's floor or waste baskets. The remainder of the smaller packages which were packed in the larger unit containers then are loose in the deliveryman's truck, and may be spilled on the ground or otherwise damaged, necessitating that such smaller packages be returned to the plant.

Many attempts have been made to use baskets of metal or other material to carry the larger loads through the hardening procedure to the storage and then onto the delivery trucks and thence into the customer's store. These attempts have been largely abandoned because the baskets fit only a limited number of the widely varied packaging sizes now utilized by the wholesale ice cream manufacturer. Almost as great a reason for abandoning the basket handling method has been the high original cost of baskets, the poor handling characteristics of the baskets, and the inability of the baskets to be nested in a minimum of space when emptied.

After the baskets have been used, the baskets, being expensive, must be placed back on the delivery truck for return to the factory. This becomes more complicated when the baskets must be returned to a branch storage facility and thence transported to another city where the factory is located.

Before frozen products may be loaded onto the transports for delivery from the factory to a branch storage facility or before such products may be loaded from the factory storage facility onto the delivery trucks in the same city, they must be further frozen in the hardening room to a very hard condition so that the packages will not be mashed upon further handling thereof, and so that, if exposed to room temperatures or outdoor temperatures during their delivery to the branch storage facilities or to the delivery trucks or to the customer's freezing display cabinets or in and out of the housewife's freezer or freezer compartment in the refrigerator, they will be cold enough not to melt quickly and thereby leak or be too soft to be considered edible.

Further hardening of the ice cream or other food product, if not done promptly after the initial mixing and freezing, results in the formation of ice crystals of a size large enough to be detected by the tongue. It has also been found that the faster one can accomplish this additional hardening of the product, the smaller will be the ice crystals in the finished product and the smoother it will taste and feel to the tongue.

Many methods for quickly freezing food products have been devised. Some methods have been unsatisfactory, some have been only partially satisfactory. Some have been more limited than others in their ability to handle a large percentage of the manufacturers' different sized packages. Most methods have been too expensive and complicated for the smaller manufacturer and have not been sufficiently flexible and economical for the larger mass production manufacturers to adopt.

Briefly, the present invention, which overcomes the disadvantages described above, includes the provision of open sided baskets which are readily and easily transported, suspended in refrigerated rooms, and stacked in a nested condition when not in use. The baskets receive and support the food containers so that substantially all sides of the containers are subject to the ambient air. In turn, the baskets are carried in spaced relationship to each other on trucks which may be propelled through refrigerated rooms on tracks when a hard freeze is to be imparted to the food. In certain embodiments of the present invention, the trucks are collapsible so that they may be readily stored. In certain embodiments, the baskets are suspended on upright racks which are provided in the refrigerated storage room. The baskets are so constructed that they may also be supported for subsequent delivery within a refrigerated transport truck in spaced relationship on upright racks or on the truck employed for the initial hard freezing of the product. Throughout all stages of the operation, any individual container is readily and easily available in its basket.

Accordingly, it is an object of the present invention to provide an inexpensive and efficient apparatus and method of conveying, storing and freezing food products.

Another object of the present invention is to provide a combination support and basket for retaining, in a readily accessible condition, containers of food products.

Another object of the present invention is to provide a new and novel basket for receiving and retaining food to be frozen.

Another object of the present invention is to provide a collapsible truck for removably receiving and retaining the baskets containing the containers of food products.

Another object of the present invention is to provide a method by which containers of food may be quickly and efficiently frozen, and whereby each container is accessible without materially disturbing the other similar containers.

Other objects, features and advantages of the present invention will become apparent from the following description when taken in conjunction with the accompanying drawing wherein like characters of reference designate corresponding parts throughout the several views, and wherein:

FIG. 5 is a side elevational view of a collapsible truck for supporting a plurality of the baskets shown in FIGS. 1 through 4.

FIG. 6 is a side elevational view of the truck shown in FIG. 5.

FIG. 7 is a plan view of the truck shown in FIG. 5.

FIG. 8 is a fragmentary horizontal sectional view of a portion of the truck shown in FIG. 5, the truck being in a righted condition.

FIG. 9 is a view similar to FIG. 8 but showing the parts as they appear when the truck of FIG. 5 is collapsed.

FIG. 12 is a perspective view of a still further modified form of truck for supporting the baskets shown in FIGS. 1 through 5.

FIG. 13 is a front elevational view of a modified form of the present invention, showing rack for supporting the frozen food containers.

FIG. 14 is a top plan view of the rack shown in FIG. 13.

FIG. 15 is a fragmentary side elevational view of a portion of the rack shown in FIG. 13.

FIG. 16 is a cross sectional view of a detail of the device shown in FIGS. 13, 14 and 15.

FIG. 17 is a plan view of a freezing room provided with tracks for receiving the trucks, such as the truck shown in FIGS. 5 through 9, or the truck shown in FIGS. 10 and 11, or the truck shown in FIG. 12.

FIG. 18 is a fragmentary side elevational view of a portion of the tracks shown in FIG. 17.

FIG. 19 is an enlarged fragmentary plan view of a portion of the tracks shown in FIG. 17.

FIG. 20 is a fragmentary side elevational view of the tracks shown in FIG. 17.

FIG. 21 is a plan view of the storage wherein the frozen food products are stored in a frozen condition, the room being provided with upright supports and receiving the baskets of FIGS. 1 through 5.

FIG. 22 is a fragmentary view of a detail showing a modification to the truck shown in FIGS. 1 through 5.

FIG. 23 is an enlarged fragmentary side view of a portion of the supports shown in FIG. 21.

FIG. 24 is a fragmentary front elevational view of a portion of the supports shown in FIG. 21, the support being illustrated supporting one of the baskets of FIGS. 1 through 5.

Figure 1:
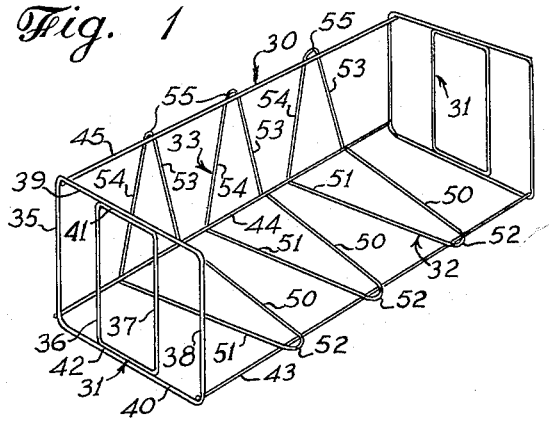
FIG. 1 is a perspective view of the basket of the present invention.

Referring now in detail to the embodiment chosen for the purpose of illustrating the present invention, it being understood that, in its broader aspects, the present invention is not limited to the exact details herein depicted, numeral 30 denotes generally the open mesh wire baskets within which the containers of food products are placed. Each basket 30 is completely open on its top and on a side (which I shall term the front side), and has a minimum of obstruction on its ends, its remaining side and its bottom.

In FIGS. 1 through 5, the basket 30 includes a pair of opposed complementary ends 31, a bottom 32 and a side 33. In more detail, the entire basket 30 is formed of metallic wire bent and welded together. The complementary ends 31 each include a rectangular outer frame and a smaller rectangular inner frame, the short opposed sides of the inner frame being welded to the central portion of the long sides of the outer frame. Thus, end 31 includes a plurality of parallel, evenly spaced, upright struts 35, 36, 37 and 38, extending between upper and lower rails 39 and 40, the outer struts 35 and 38 being integrally joined to the ends of the upper and lower rails 39 and 40, and the inner struts 36 and 37 being integrally joined to cross bars 41 and 42. As mentioned above, the cross bars 41 and 42 are welded or otherwise secured in side-by-side relationship to the inner surface of rails 39 and 40, respectively.

Extending between the lower outer corners of the ends 31 is a front bar 43, while a back or rear bar 44 extends between the rear lower corners of ends 31. Between the upper rear corners of ends 31 is a top bar 45, the bars 43, 44 and 45 being parallel to each other and secured, as by welding, by their end portions to the respective corners.

The ends of bars 43 and 45 are within the corners of frames 31, while the ends of bars 44 are outside the corners.

A plurality of juxtaposed, U-shaped bottom members extending between the bars 43 and 44 provide a bottom for the basket 30. Each bottom member includes a pair of forwardly converging legs 50 and 51 joined at their forward ends by a loop 52 which provides a rounded end protruding beyond the forward bar 43. The forward portion of the bottom members passes over the top of bar 43, while the rear portions, i.e. the ends of bars 50 and 51, are secured to rod 44.

In like manner the back of the basket 30 is formed, the back including a plurality of U-shaped back members, each member having upwardly converging legs 53 and 54 and a rounded end 55 joining the upper ends of legs 53 and 54. The back members are in juxtaposition with each other and are joined to the bars 44 and 45 so that the ends 55 of all back members extend above the bar 45, as seen in FIG. 3.

The ends 31 of basket 30 diverge forwardly toward its front open side and also diverge upwardly so that one basket 30 may be readily and easily nested within another, etc.

Figure 2:
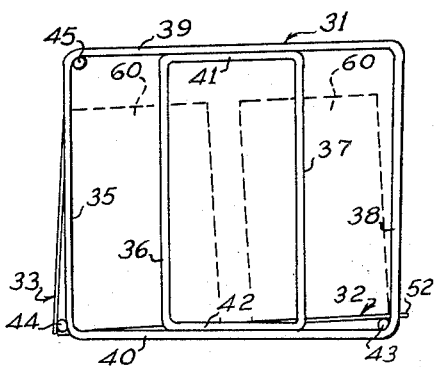
FIG. 2 is a side elevational view of the basket shown in FIG. 1.
Figure 3:
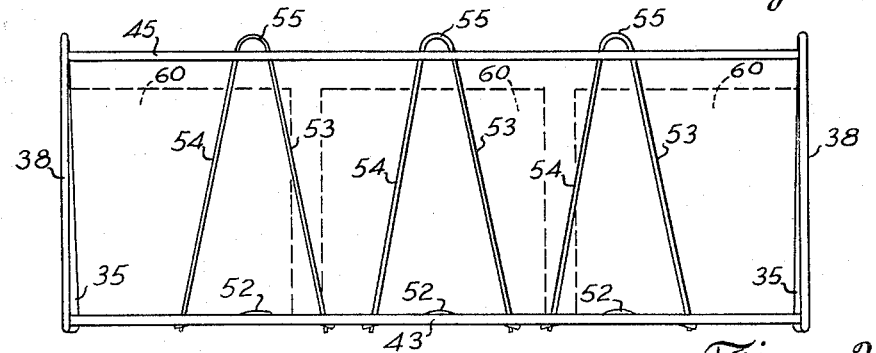
FIG. 3 is a front elevational view of the basket shown in FIG. 1.
Figure 4:
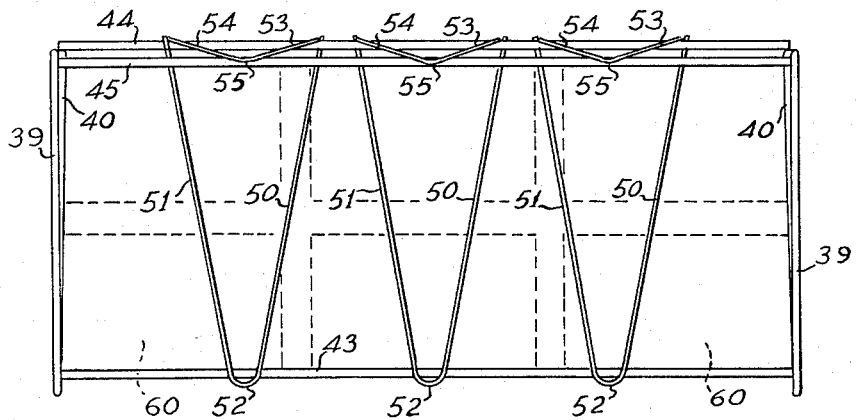
FIG. 4 is a top plan view of the basket shown in FIG. 1.

The baskets 30 are elongated members and are each so dimensioned as to provide a supporting shelf, longitudinally, for a plurality of three of the usual package or container 60 consisting of two one-half gallon rectangular ice cream cartons, containers 60 being shown in broken lines in FIGS. 2 and 3. The containers 60 are arranged in pairs extending forwardly and rearwardly, i.e. transversely as seen in FIG. 2, thereby providing a total of six containers or about 25 pounds of product per basket 30. The containers 60 are spaced in side-by-side relationship both transversely and longitudinally of the basket 30, as seen in FIGS. 2 and 3. The diverging ends 31 assure that regardless of size, the forward portion of containers 60 carried by the basket 30 may be spaced apart. Thus, on at least five of the six sides of each rectangular container 60 are essentially unobstructed and presented to the ambient air.

Furthermore, the particular configuration of the basket 30 permits ready access to any container 60 thereon, the front containers 60 being withdrawable forwardly or upwardly and the back containers being withdrawable upwardly in the event the adjacent front containers are not removed to permit forward withdrawal. The basket 30 is also peculiarly suited for supporting substantially any other size container normally used in the packaging of ice cream, and is peculiarly suited for passing through narrow doors such as are provided in hardening rooms, certain types of trucks and the like.

The collapsible truck

The collapsible truck of FIGS. 5 through 9 is designed to support for transportation the baskets 30. This truck 70 includes a pair of spaced, parallel, vertically disposed standards 71, the distance between the standards 71 being slightly less than the length of baskets 30. As best seen in FIGS. 8 and 9, each standard 71 is a hollow tubular member, rectangular, i.e. square, in cross section. One or a plurality of cross bars, such as cross bar 72, may be provided between the upright standards 71, the ends of cross bar 72 being hingedly secured to sides of the standards 71 intermediate the ends thereof. The hinged connection for one end of cross bar 72 includes a hinge 73 secured between the outer sides of bar 72 and the outer side of one of standards 71. The other end of bar 72 includes a similar hinge 74 on an opposite side from hinge 72 whereby the standards 71 pivot about vertical axes in the same direction but against opposite sides of bar 72.

Opposite the hinge 73 on the same end of bar 72 is a flat rectangular tongue 75 which protrudes forwardly beyond the end of bar 72 so as to be engaged by the side of its associated standard 71 when the standard 71 is in the position shown in FIG. 8. If desired, a suitable pin (not shown) may be passed through appropriate holes in tongue and in the standard 71 to lock the standard in its position, as seen in FIG. 8, or the tongue may serve simply as a friction latch.

The lower ends of standards 71 are respectively provided with base bars 76, the ends of standards 71 being connected to the midportions of bars 76. The base bars 76 extend horizontally and are provided with casters at their extremities, the casters each comprising a wooden cylindrical roller 77, a pin 78 passing along the axis of the roller 77 and a U-shaped bracket 79 fixed to the lower side of the base bar 76. The pins 78 are parallel to the bars 76 so that the truck 70 may be propelled from left to right and vice versa, in FIG. 5.

To maintain the truck in a righted condition, a diagonally extending strut, such as strut 80 in FIG. 7, is provided between the base bars 76. The ends of these struts, such as strut 80, are bent downwardly and project through holes in the diagonally opposed end portions of the base bars 76 and hence are readily removable.

When not in use, the truck 70 may be collapsed, as illustrated in FIG. 9, by first removing the strut 80, and then pivoting the standards 71 from the position shown in FIG. 8 to the position shown in FIG. 9. In such a position, the trucks occupy very little space.

While in FIGS. 5, 6 and 7 I have illustrated the end of standards 71 as being rigidly secured to the base bars 76, and have illustrated gusset bars 81 for reinforcing the junction thus produced, an alternate construction is illustrated in FIG. 22 whereby, in place of having the base bars 76 folding (upon rotation of standards 71) into a flattened condition against each other, the standards may fold against the base bars. To accomplish this, a hinge 73' is provided between the side of each standard 71' and the side of the base bar 76', the hinge having a horizontal axis. To maintain the standard 71' in an upright condition, a locking finger 75' for maintaining standard 71' upright is provided outwardly of hinge 73', the finger 75' being pivotally connected by its upper end to standard 71' by means of a bolt 72'. From the bolt 72', the finger 75' normally extends downwardly and outwardly to terminate against a block 77' on base bar 76'; however, the finger 75' may be pivoted out of alignment with the block 77' to permit standard 71' to be folded against base bar 76'. An upstanding backing block 81' carried by base bar 76' limits further pivoting of standard 71' in a clockwise direction beyond its upright condition, thereby providing an abutment for standard 71' when it is pivoted to an upright condition.

It will be understood that while FIG. 25 illustrates a single standard 71' and a base bar 76', the construction illustrated therein is to be used for both ends of truck 70. In such an arrangement, bar 72 and standards 71, seen in FIG. 1, should be rigidly secured together when the construction of FIG. 25 is to be used.

Referring back to FIGS. 5 through 7, it will be seen that at spaced intervals along the standards 71 are U-shaped metallic rods secured by the midportion of their webs to standard 71 to provide hanger members 85, the arms of which protrude beyond the side of its standard 71 and upwardly to receive the baskets 30. The hanger members 85 are arranged in horizontally aligned pairs whereby an upwardly open hook formed by a member 85 of one standard 71 is aligned with a complementary hook on the other standard 71.

It will be seen best in FIG. 5 that all hanger members 85 are secured on the outsides of the standards 71 and are evenly spaced vertically along each standard 71 by a distance greater than the height of basket 30. The distance between adjacent hanger member 85 on the same standard 71, however, is just sufficient to permit (when the baskets 30 are received on the hangers 85) access to the rear portion of each basket 30 so that a rear container 60 may be removed therefrom.

Below each hanger member is a cooperating stop which projects outwardly from both sides of the standard 71 to be engaged by the lower portion of a basket 30. The purpose of the stops is to hold all baskets 30 on truck 70 in a slightly upwardly and outwardly tilted condition and thereby prevent the inadvertent dropping of a container 60 from any basket 30, due to vibration as the truck 70 is moved across the floor. In the present embodiment, the stop is an isosceles triangular shaped bar 86 having a wide base and upwardly converging arms; the bar 86 is secured by the midportion of its base and by the apex of its arms to the inner surface of standard 71. The vertical distance between the midportion of bar 86 and the web of its hanger 85 is equal to the height of the basket 30.

The distance between standards 71 of truck 70 is slightly less than the length of basket 30, whereby the upper bar 45 may be disposed over the hook portions of a horizontally aligned pair of hangers 85 on one side of standards 71, and a second basket 30 may be disposed over the other hook portions on the other side thereof. When so disposed, the hook portions of the pair of hangers 85 are inwardly adjacent the ends 31 of basket 30 while the bar 44 of basket 30 rests on the horizontally aligned pair of arms of a pair of bars 86. The position of basket 30 is therefore essentially the same as the basket 30 shown in broken lines in FIG. 24. The basket 30 may be readily removed by lifting it upwardly and away from the hangers 85 which support it.

It is now seen that when the truck 70 is loaded, there are a plurality of baskets 30 on each side of the truck 70, each basket 30 facing outwardly, and being spaced both vertically and transversely from an adjacent basket 30. Hence, ambient air may readily pass around each basket 30 and any one container 60 may be removed without either removing the basket 30 from the truck 70 or removing another container 60 from the basket 30.

Second embodiment of truck

Figure 10:
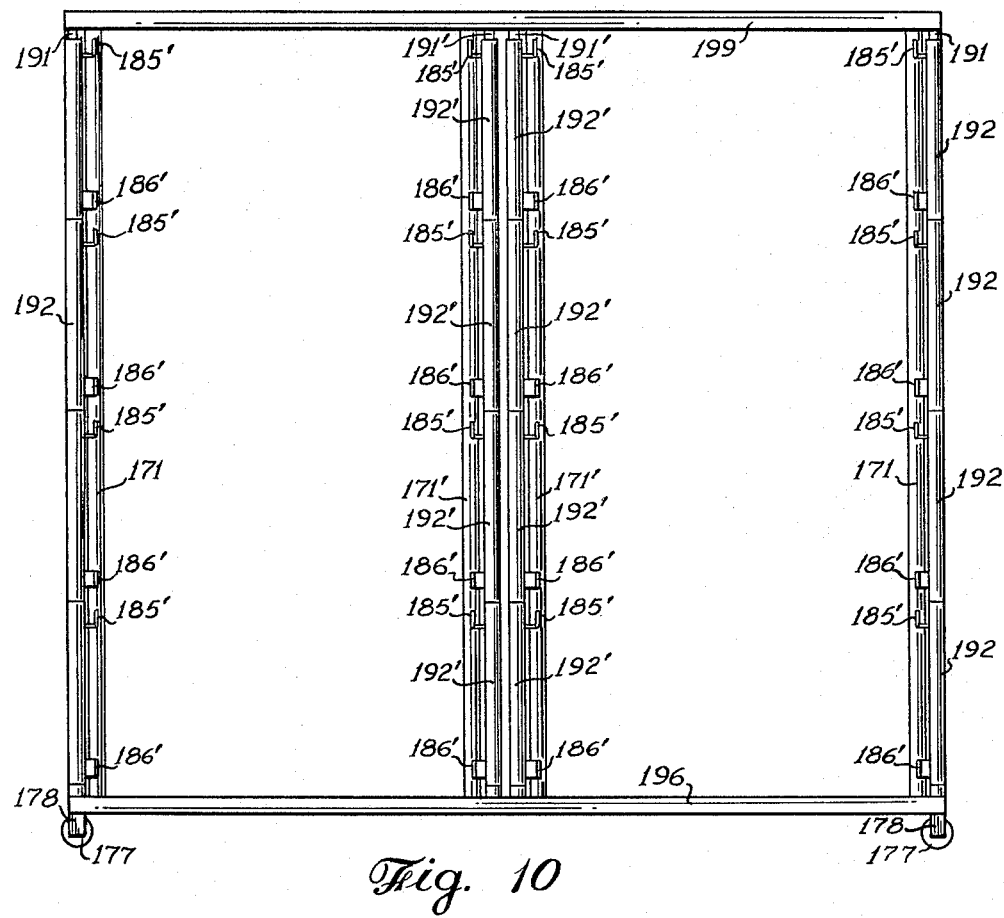
FIG. 10 is a side elevational view of a modified form of truck for supporting the baskets of FIGS. 1 through 5.
Figure 11:
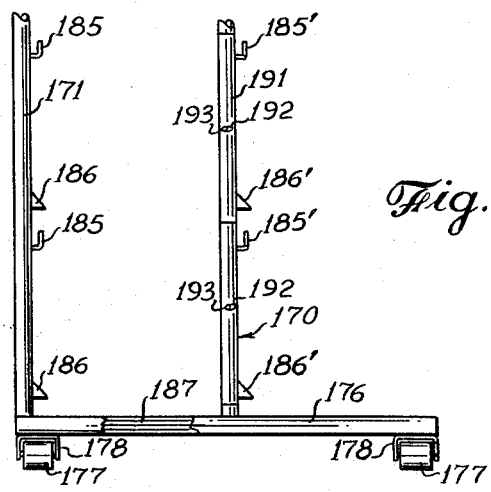
FIG. 11 is an end view of the truck shown in FIG. 10.

In FIGS. 10 and 11 is shown a second embodiment of a truck 170 for receiving and transporting the baskets 30, each basket 30 being slightly inclined in the manner previously described, and each basket 30 being readily removable from the truck 170.

In more detail, the truck 170 of FIGS. 10 and 11 includes a rectangular frame base having base bars, such as bar 176, and longitudinally parallel base bars, such as bar 196, the bars 176 and 196 being joined at their ends. Supported between approximately the midportions of the longitudinal bars 196 are a pair of closely adjacent center bars, such as bar 187. This completes the frame of truck 170. Depending from the end portions of bars 176 are the brackets 178 which support for rotation the rollers 177, the axis of rotation of each roller 177 being parallel to the bars 176. Thus, the truck 170 may be moved on rollers 177 in a longitudinal direction.

Extending upwardly from the back longitudinal bar 196 are a plurality of standards 171, 171'. The outer standards 171 are located adjacent the corners of the frame, while the inner standards 171' are located on opposite sides of the cross bar 187. The standards 171, 171' are parallel to each other with adjacent pair of standards 171, 171' being spaced apart less than the length of a basket 30 and the standards 171' being adjacent each other. Each standard 171 and 171' is provided with a plurality of upwardly opening L-shaped hooks 185, one above the other and aligned horizontally with similar hooks 185 on the other standards 171, 171'. The spacing vertically of hooks 185 is the same as the spacing for hanger members 85, whereby each horizontal pair of hooks respectively on standards 171 and 171' receives a basket 30, the basket 30 being tilted outwardly and upwardly slightly by a stop or triangular shaped brace 186 associated with and below the hook 185 on each of standards 171, 171'.

The hooks 185 and braces 186 project from their standards 171, 171' in a transverse direction over the frame of truck 170 whereby the baskets 30 may be supported over the frame in a pair of vertically aligned groups.

At midportion of each base bar 176 is an upstanding standard 191. At the midportion of each central bar 187 is an upstanding standard 191'. Each pair of these standards 191, 191' is spaced apart a distance greater than the distance between standards 171, 171' and greater than the length of a basket 30. Therefore, a basket 30 being installed on the standards 171, 171' is sufficiently short that it may pass between a standard 191 and a standard 191'. Hence, as viewed transversely in FIG. 10, the standards 191' are the standards 171', and standards 191 are outwardly of standards 171.

Each of standards 191, 191' is a cylindrical rod on which is received a plurality of abutting, rotatable, individually rotatable sleeves, sleeves 192 being received on standards 191, and sleeves 192' being received on standards 191'. Each sleeve 191, or 191' carries one upwardly opening hook 185' and one stop or brace 186', even though it may be found desirable to provide more groups of hooks and braces thereon in some applications. The hooks 185' are small cylindrical rods which project radially from the sleeves 192, 192' and are turned horizontally outwardly and thereafter upwardly at their ends, thus being different from the usual L-shaped hook 185. Likewise, each brace 186' projects radially outwardly and is bent horizontally to form an L-shaped member having an outwardly and upwardly beveled edge.

Each sleeve 192, 192' may be rotated through 90° to move its hook 185' and brace 186' from the inwardly protruding position shown in the drawings to a forwardly protruding position and back to their original inwardly protruding positions. For this limited rotation, each sleeve 192, 192' is provided with a slot 193 through which projects a pin 194, the pin 194 being received in the standard, such as standards 191 and 191'.

When rotated inwardly, the hooks 185' are adapted to receive baskets 30 which are tilted slightly outwardly and upwardly by the braces 186', these baskets 30 being aligned with the baskets 30 carried by the hooks 185. When no baskets 30 are received on the hooks 185', the sleeves 192, 192' may be respectively rotated outwardly to permit passage between standards 191, 191' of the baskets 30 which are to be received on the hooks 85.

A top rectangular frame 199 joins the upper ends of standards 171, 191.

*Third embodiment of truck*

The third embodiment of the truck is seen in FIG. 12 wherein the truck 270 includes a rectangular frame consisting of parallel longitudinal base bars 296 and parallel transverse bars 276 and provided with rollers 277. Outer standards 271 project upwardly from two adjacent corners of the frame while inner standards 271' project upwardly from the central portion of one of the bars 296, the standards 271, 271' being in alignment along one side of the truck 270 and being parallel to each other. Essentially horizontally extending braces 286 protrude from the standards 271, 271'. Each brace 286 is supported in cantilever fashion by the standard and protrudes in an essentially horizontal direction over the frame of truck 270, being tilted slightly outwardly and upwardly. All braces 286 on a single standard are in vertical alignment while the braces 286 of respective standards 271, 271' are in longitudinal alignment, being spaced longitudinally and being parallel transversely of truck 270.

In the midportion of each brace 286 is a protuberance 287, the function of which is to space the adjacent baskets 30 apart, as will be described hereinafter.

Each horizontal pair of braces 286 which respectively extend from a standard 271 and standard 271' supports by its bottom 32 a pair of baskets 30, the two baskets being spaced apart by the protuberances 287.

The top portion of truck 270 is provided with a top frame including standard extensions 291, 291' which extend respectively from the ends of standards 271, 271'. The upper ends of all standard extensions 291, 291' are joined by a top bar 299. The abutting ends of standards 271, 271' and standard extensions 291, 291' are hingedly secured together by hinges 288, 288' so that the top portion of truck 270 may fold inwardly over the topmost braces 286 when those braces are not filled with baskets 30, the purpose being to permit the truck 270 to pass through openings which otherwise would not be high enough.

*Combined truck and basket assembly*

The combination truck and basket assembly is seen in FIGS. 13 through 16. This is a non-collapsible structure which may either be provided with supporting legs 377 and/or the rollers of the preceding trucks. As illustrated, the truck 370 of the present invention includes a rectangular, horizontal base frame having parallel transversely extending base bars 376 and parallel longitudinally extending base bars 396, the bars 376 and 396 being joined at their ends. The frame, as illustrated, is supported by legs 377 which depend from the corners of the frame.

Extending upwardly from the corners of the frame are a plurality of four upright standards 371 which terminate in a common horizontal plane above the base frame. Extending between the front pair of standards 371 are a plurality of parallel front bars 343 which are evenly spaced vertically with respect to each other to define a plurality of shelves one above the other, as will be described hereinafter.

Between the standards 371 at each end of the frame there are a plurality of pairs of end rails 339 and 340, the front end rails 339 being aligned with the ends of bars 343 at a slight inclination and, hence, extend inwardly and downwardly from front standards 371 to the rear standards 371, as seen in FIG. 15. The end rails 339 and 340 at one end of the truck are opposite to end rails 339 and 340 at the other end of the truck so that each upper end rail 340 at one end of the truck has a corresponding upper end rail 340 at the opposite end thereof. Likewise, each lower end rail 339 at one end of the truck has a corresponding or opposed rail 339 at the opposite end of the truck.

Extending longitudinally between each opposed pair of rails 339 are an intermediate bar 344 and a back bar 345, the bars 344 and 345 being parallel to and spaced from each other and parallel and spaced from the front bar 343. The intermediate bar 344 is approximately midway between the front and back of the truck while the bar 345 is spaced slightly inwardly of the vertical plane of the back base bar 396. Parallel to and spaced midway between each pair of end rails 339 is a transverse center rail 341 which extends between the back bar 345 and the front bar 343, intersecting the central bar 344 in the central portion of each shelf. Thus, four rectangular open spaces are provided at each shelf of the truck. Within each of these rectangular spaces is a bottom member which in this embodiment is a zigzagged metallic wire 350, the front bottom wires 350 extending between the bars 343 and 344 and the back bottom wires 350 extending between the bar 344 and the bar 345, as best seen in FIG. 14.

Hingedly secured to each of the central or intermediate bars 344 are a pair of juxtaposed back members 333. Each back member 333 includes an inverted U-shaped wire strap 353, the ends of which terminate adjacent the bar 344. Welded to the ends of straps 353 are crescent shaped stop members 354, the strap members 354 partially encompassing the bar 344, as shown in FIG. 16, so that the end of each stop member 354 abuts a portion of the bottom wire 350 when the member 333 is in its upright slightly rearwardly tilted position. Connecting the end portions of each strap 353 is a cross bar 355, seen in FIG. 16. Zigzagged wire back members 357 extend between the bar 355 and the web portion of the U-shaped strap 353 so as to provide a back for each member 333. Rings 356 retain the bars 355 and bars 344 in close parallel proximity. Hence, each member 333 is free to fold forwardly beyond the center of gravity and fold downwardly on the bottom 350.

The back bar 345 is provided with additional foldable back members 356 which are essentially identical in construction to the members 333 and fold forwardly against the bottom members 350. Transversely of the center portion of the truck 370, each bar 341 is provided with a pair of juxtaposed partition members which have essentially the same construction as member 333 and are adapted to fold sidewise down over the bottom 350. Thus, when partitions 357 and/or the back members 333 and 356 are not in use, they may be folded on top of the bottom so as to be out of the way, permitting the bottom of each rack to be utilized for receiving larger units of food to be frozen.

*Rail assembly*

For the purpose of supporting a plurality of rows of trucks 70, 170, 270 or 370 in a hardening room and so as to arrange these trucks conveniently, such that after a truck 70, 170, 270 or 370 has been in the hardening room for a predetermined length of time it may be removed therefrom, there is provided a rail assembly seen in FIGS. 17, 18, 19 and 20, the rail assembly including a pair of rows of spaced parallel stanchions or standards 400, each being provided at its lower end with a foot bar 401. Immediately above each foot bar 401 in the front row is a transversely extending bottom strut 402 which connects the lower end portions of each of the upright stanchions 400 along a front row of such stanchions. A similar bar (not shown) is provided along the rear group of stanchions 400.

Additional transverse struts parallel to and spaced above the strut 402 may be provided. For example, the upper struts 404 are connected adjacent the upper ends of stanchions 400 in each row of stanchions so as to cooperate with the lower struts 402 to maintain the stanchions in two parallel rows. On each stanchion 400, midway between the struts 402 and 404, is a transversely extending stub strut 405, seen in FIG. 18. It is now seen that each strut 402, 404, 405 which is connected to a forward stanchion 400 has an opposed strut 402, 404, 405 on a rear stanchion 400 so that each opposed pair of struts supports therebetween a pair of outwardly facing rails 407 and 408. The outer stanchions 400, however, as seen in FIG. 17, are provided with rails 409 along their inner sides only.

Each of stanchions 400 is a channel or L-shaped member, the vertex or common edge of which faces outwardly and the respective flanges thereof diverge inwardly. Likewise, the struts 402, 404 and 405 are each at angle irons or channels which have their vertex or common edge facing inwardly whereby the flanges of the struts abut the flanges of standards 400. It will be understood that the struts 402, 404 and 405 extend horizontally while the stanchions 400 extend vertically, thus each strut 402, 404, 405 is perpendicular or normal to each stanchion 400.

The rails 407, 408 and 409 are each channel members which are arranged in pairs opposed to each other with their horizontal flanges extending toward each other. Thus, in FIG. 17, with exception of the outer rails 409 which respectively are opposite the next adjacent inward inner rails, i.e. rails 407 and 408 respectively, each rail 407 has an opposed rail 408. The vertical flanges of each rail 407, 408 and 409 are parallel to each other and form guides which prevent the inadvertent jumping of the rail by a truck.

Brackets 410, best seen in FIG. 19, connect the ends of each rail, such as rails 407 and 408, to the struts, such as strut 404.

From an examination of FIG. 18, it will be seen that there are three horizontal layers or groups of rails spaced vertically one over the other in the rail assembly of the present embodiment. This could be multiplied, of course, to provide additional rails thereabove.

In operation, the rail assembly is mounted in a small hardening room or a freeze room which is reduced to an extremely low temperature, such as the room 420 outlined in FIG. 17. Preferably, the struts extend from one wall 421 to the other wall 422 while an access door 423 is provided in the front wall 424. The room 420 also includes a back wall (not shown) which has an access door (not shown) through which the trucks are removed. Appropriate refrigeration equipment (not shown) may provide a flow of air sidewise from one wall 421 to another wall 422 to thereby provide adequate cold ambient air to impart a hard freeze to any trucks carried by the rails. The stanchions 400 and struts 402, 404, 405 are so positioned as to reduce the resistance to air flow which they afford to a minimum.

It will be understood that, after the trucks, such as trucks 70, 170 and 270, have been loaded with an appropriate number of baskets 30, the baskets 30 each carrying a plurality of packages 60, they are inserted in tandem on pairs of opposed rails, such as rails 407 and 408, one truck following the other until each pair of rails is filled with a plurality of such trucks. The trucks may be appropriately timed in their insertion so as to discharge a rearmost truck from the rear end of the rail assembly as a new truck is added to the front of the rail assembly. In this way, by timing the inserted new trucks, a predetermined time interval is provided for each truck to be in the hardening room 420.

*Storage room*

From the hardening room 420, the usual procedure utilizing the present invention would be to store the frozen food in a storage room 520. The storage room assembly is illustrated in FIGS. 21, 23 and 24, wherein it is seen that a plurality of stanchions or standards 570 are respectively provided with a plurality of spaced U-shaped hanger members 585, the hanger members 585 being identical in construction to the hanger members 85. Each standard 570 includes a plurality of pairs of opposed parallel hanger members 585 on opposite sides thereof, as seen in FIG. 23.

It will be understood that the standards or stanchions 570 are arranged in alignment in rows 571, 572, 573, 574 and 575, being spaced from and parallel to each other and being supported between the floor and ceiling in a storage room 520. Preferably, the stanchions or standards 570 are arranged in parallel rows such as rows 571, 572, 573, 574 and 575. The outer rows 571 and 575 which are against the opposite side walls of storage room 520 are provided with hanger members (not shown) which extend inwardly only.

Below each hanger member 585 and extending transversely across the row of standards or stanchions 570 are a pair of stop bars 586 and 586', secured to the opposite edges of all stanchions 570 in a single row. Hence, when a basket 30 is hung on one side of a pair of stanchions 570 and is supported by its opposite ends by an inner opposed pair of hanger members 585, the basket 30 will rest in a slightly upwardly and outwardly tilted position against one of the bars 586, 586'.

The rows 571, 572, 573, 574 and 575 are so spaced apart that, when the baskets 30, facing outwardly, are disposed on opposite sides of the inner rows 572, 573 and 574, they face aisles 591, 592, 593 and 594, while the baskets 30 carried by the rows 571 and 575 face inwardly toward the aisles 591 and 594, whereby a person walking down the aisles may have access to any preselected container 60 in any basket 30.

Aisles 591, 592, 593 and 594 are parallel to each other and communicate with a common aisle 595 which is perpendicular to the aforesaid aisles. An entrance 596 and an exit 597 may be provided at opposite ends of the aisle 595, there being provided between the entrance and exit adjacent the wall a row 598 of supporting stanchions 570 for supporting additional baskets 30.

Under normal circumstances, the hardening room 420 and the storage room 520 are maintained at substantially below freezing temperature, and the door 596 may interconnect the hardening room 420 and the storage room 520 whereby each truck as it is discharged from the rail assembly may be manually moved into the storage room where the baskets 30 are removed from the truck and installed on the rows of stanchions 570. When it is desired to load a delivery truck with food products, such as container 60, the individual baskets 30 may be removed from the rows of stanchions 570 and/or transported either on the trucks 70, 170 or 270 or manually to a refrigerated delivery truck (not shown). Also, the baskets 30 may be retained on the trucks 70, 170, 270 and 370 and delivered as a unit to the delivery truck (not shown). In this delivery truck will be the same sort of storage arrangement for hanging the baskets as has heretofore been described for the storage room. Thus, the baskets 30 are freely available to be selectively removed and transported in retail stores or the individual packages 60 therein may be removed from the baskets 30 as the baskets remain in the delivery truck.

It will be obvious to those skilled in the art that many variations may be made in the embodiments here chosen for the purpose of illustrating the present invention without departing from the scope thereof as defined by the appended claims.

I claim:

1. A two sided open wire work basket for receiving articles to be stored, comprising a pair of opposed ends, each including a rectangular peripheral frame formed of a metallic rod and reinforcing means extending within said frame, three parallel rods extending between three corresponding corners of said frames, a bottom defined by metallic rods extending between two of said three parallel rods disposed in a substantially horizontal plane, and a back defined by metallic rods extending between two of said three parallel rods disposed in a substantially vertical plane, said basket having an open unobstructed front side and an open unobstructed top.

2. A two sided open wire work basket for receiving articles to be stored, comprising a pair of opposed ends, each including a rectangular peripheral frame formed of a metallic rod and reinforcing means extending within said frame, three parallel rods extending between three corresponding corners of said frames, a bottom defined by metallic rods extending between two of said three parallel rods disposed in a substantially horizontal plane, and a back defined by metallic rods extending between two of said three parallel rods disposed in a substantially vertical plane, said basket having an open unobstructed front side and an open unobstructed top, said ends diverging toward said unobstructed sides whereby a plurality of said baskets may be nested one within another when said baskets are stored.

3. In a system for supporting a plurality of articles, supporting means and a plurality of individually removable outwardly facing two sided open wire work baskets supported by said supporting means, each basket comprising a pair of opposed ends, each including a rectangular peripheral frame formed of metallic rods and reinforcing means extending within said frame, three parallel rods extending between the corners of said frames, a bottom defined by metallic rods extending between two of said three parallel rods disposed in a substantially horizontal plane, a back defined by metallic rods extending between two of said three parallel rods disposed in a substantially vertical plane, said basket having an open unobstructed front side and an open unobstructed top, said ends diverging toward said unobstructed side whereby a plurality of said baskets may be nested within the other when said baskets are stored.

4. In a system for supporting a plurality of articles, a vertical support, vertically spaced hanger members extending from said vertical support, and a plurality of removable baskets carried by said hanger members, said baskets each having sides, a back and a rearwardly declining bottom, each of said baskets being provided with an essentially open front and an open top, said hanger members engaging the backs of said baskets whereby the bottoms of each basket are disposed one over the other in spaced relationship and the front side of all baskets are disposed outwardly of said support in the same direction.

5. In a system for supporting a plurality of articles, a pair of upright standards, a plurality of upwardly opening hooks on each standard, the hooks on one standard being respectively horizontally aligned with the hooks on the other standard, a plurality of stops below the horizontally aligned pair of hooks, a plurality of individual baskets respectively removably supported by the horizontally aligned pairs of hooks, each basket being characterized by a bottom, a back connected to one side of said bottom and a pair of ends extending from the ends of said bottom and connected to the ends of said back, said baskets each being provided with an open side and an open top, the vertical distance between said hooks and the stops therebelow being less than the heights of said baskets so that when each of said baskets is installed on said hooks the bottom portion of each of said baskets engages a stop and is held by said hooks and said stop in an outwardly and upwardly tilted position.

6. In a system for supporting a plurality of articles, a pair of upright standards, a plurality of upwardly opening hooks on each standard, the hooks on one standard being respectively horizontally aligned with the hooks on the other standard, a plurality of stops below the horizontally aligned pair of hooks, a plurality of individual baskets respectively removably supported by the horizontally aligned pairs of hooks, each basket being characterized by a bottom, a back connected to one side of said bottom and a pair of ends extending from the ends of said bottom and connected to the ends of said back, said baskets, each being provided with an open side and an open top, said ends diverging outwardly from said back whereby a plurality of such baskets may be nested one within the other, the vertical distance between said hooks and said stops being less than the heights of said baskets so that when each of said baskets is installed on said hooks the bottom portion of each of said baskets engages a stop and is held by said hooks and said stop in an outwardly and upwardly tilted position.

7. In a system for supporting a plurality of articles, a pair of upright standards, horizontally aligned supporting hooks on said standards, a plurality of stops below each horizontally aligned pair of hooks, a plurality of individual baskets respectively removably supported by the pairs of hooks, each basket being characterized by a bottom, a back connected to one side of said bottom and a pair of ends extending from the ends of said bottom and connected to the ends of said back, said baskets each being provided with an open front side and an open top, the vertical distance between said hooks and said stops being less than the height of said basket so that when said basket is installed on said hooks the bottom portion of said basket engages a stop and is held by said hooks in an outwardly and upwardly tilted position, a pair of base bars connected to the ends of said standards, said base bars being of a length in excess of the widths of said baskets, rollers on said base bars, and a pair of opposed tracks for supporting said rollers.

8. A truck for conveying articles comprising a base, a plurality of standards extending upwardly from said base, a plurality of supporting members carried by said standards, said supporting members being disposed one over the other and providing spaced shelves for supporting articles thereon, said shelves each being inclined rearwardly, backs on said shelves against which said articles may rest when received by said shelves, each of said shelves being formed of wire members defining the edges of each shelf and spaced wire members extending between the edges of said shelf, each back including wire members forming at least a portion of the edges of said back and spaced wire members extending between the edges of said back.

9. The structure defined in claim 8 wherein said supporting means include upwardly opening hooks which removably receive said baskets, and stop members therebelow on said standards for holding said baskets in tilted positions.

10. The structure defined in claim 9 wherein said hooks and said stop members are pivotally carried by said standards.

11. In a device for supporting a plurality of articles, a pair of upright standards, supporting means on said standards, baskets carried by said supporting means, said baskets being disposed one over the other and extending sideways from said standards, means for supporting said standards including a pair of space bars respectively connected to the ends of said standards, said baskets being removably connected to said standards, and means for folding said standards and said bars into a more compact arrangement upon removal of said baskets therefrom.

12. The basket as set forth in claim 2 in combination with a rack including means for removably supporting a plurality of said baskets with the bottoms of the baskets downwardly inclined from the open unobstructed front side.

13. The basket as set forth in claim 2 in which metallic rods defining the bottoms and back are return bent with the return bends thereof protruding beyond the parallel rods at the forward edges of bottom and the top edge of the back respectively.

14. The basket as set forth in claim 2 in which the bottom declines rearwardly from the open unobstructed front side.

15. The basket as set forth in claim 2 in combination with a transportable wheeled rack including means for removably supporting a plurality of rows of said basket on each side of the rack, with their open unobstructed front sides facing outwardly from the rack and their bottoms inclined downwardly from the open unobstructed front side.

16. A two sided open wire work basket including, opposed outwardly flaring, angularly related ends each defined by a substantially rectangular frame formed from a continuous metallic rod, a front bar secured at the lower front corners of said frames, a diametrically opposite top bar secured to the upper rear corners of said frames, a rear bar lying in a common horizontal plane with the front bar and in a common vertical plane with the top bar, a back defined by rods extending between said top bar and said rear bar, and a rearwardly declined bottom defined by rods extending from the top of said front bar to the bottom of said rear bar, said basket having an open unobstructed front and an open unobstructed top.

References Cited by the Examiner

UNITED STATES PATENTS

| | | | |
|---|---|---|---|
| Re. 13,395 | 2/12 | Shek | 211—178 |
| 815,338 | 3/06 | McClure | 211—178 |
| 1,359,479 | 11/20 | Angle | 108—50 |
| 2,568,546 | 9/51 | Hoeft | 211—178 |
| 2,622,541 | 12/52 | Smart | 211—162 |
| 2,754,024 | 7/56 | Planeta | 220—97 |
| 2,812,069 | 11/57 | Trammell | 211—162 |
| 2,974,497 | 3/61 | Carpenter | 62—63 |
| 2,974,807 | 3/61 | Furrer | 211—126 |
| 2,998,886 | 9/61 | Sides | 211—126 |
| 3,016,150 | 1/62 | Lake | 108—102 |
| 3,027,728 | 4/62 | Greer | 62—63 |
| 3,038,613 | 6/62 | Sylvester | 211—162 |

FOREIGN PATENTS

| | | |
|---|---|---|
| 283,422 | 1915 | Germany. |
| 1,236,816 | 6/60 | France. |

CLAUDE A. LE ROY, *Primary Examiner.*

EDWARD J. MICHAEL, *Examiner.*